United States Patent [19]

Ladney, Jr. et al.

[11] 4,352,767

[45] Oct. 5, 1982

[54] ELIMINATION OF PAINT FLASH ON FOAM MOLDED ARTICLES DURING THEIR MOLDING

[75] Inventors: Michael Ladney, Jr., 45 Oxford Rd., Grosse Pointe Shores, Mich. 48236; Raymond W. Hatfield, Warren, Mich.

[73] Assignee: Michael Ladney, Jr., Grosse Pointe Shores, Mich. ; a part interest

[21] Appl. No.: 220,428

[22] Filed: Dec. 29, 1980

[51] Int. Cl.³ .................. B29D 27/00; B29C 17/12
[52] U.S. Cl. ................... 264/46.6; 264/161; 425/310; 425/806; 425/817 R
[58] Field of Search ............. 264/46.6, 161; 425/310, 425/806, 817 R

[56] References Cited

U.S. PATENT DOCUMENTS

| | | | |
|---|---|---|---|
| 1,195,204 | 8/1916 | Gleason | 264/161 |
| 2,028,808 | 1/1936 | Rosenthal | 264/161 X |
| 2,148,079 | 2/1939 | Martin | 18/42 |
| 2,308,649 | 1/1943 | Dean | 425/310 X |
| 3,487,134 | 12/1969 | Burr | 264/46.6 |
| 3,795,722 | 3/1974 | Sassaman | 264/46.6 X |
| 3,843,291 | 10/1974 | Drab | 425/215 |
| 3,981,711 | 9/1976 | Bjorkstrom | 65/165 |
| 4,209,564 | 6/1980 | Nomura et al. | 264/46.6 X |
| 4,251,476 | 2/1981 | Smith | 264/46.6 X |

Primary Examiner—Philip E. Anderson
Attorney, Agent, or Firm—Barnes, Kisselle, Raisch & Choate

[57] ABSTRACT

The cavity surface of a foam mold is sprayed with a paint which becomes integrally bonded to the outer surface of the foam molded part. The sprayed paint unavoidably overlaps the parting faces of the mold around the outer edges of the mold cavity. In order to avoid the necessity of trimming a paint flash from the molded part along a line corresponding to the parting line of the mold, after the cavity is spray painted and while the paint is still wet the line of intersection between the cavity and the parting faces of the mold is contacted with a member which interrupts the continuity of the paint film. This avoids the formation of the paint flash on the molded part.

11 Claims, 6 Drawing Figures

ELIMINATION OF PAINT FLASH ON FOAM MOLDED ARTICLES DURING THEIR MOLDING

This invention relates to foam molding and, more particularly, to the elimination of paint flash from the molded article at the parting line of the mold.

In foam molding polyurethane plastic articles one or both halves of the mold are frequently sprayed with an elastomeric paint compatible with the foam molding resin so that, when the mold is closed and the part is molded, a layer of paint is transferred from the surface of the mold cavity and integrally bonded to the outer surface of the foam molded part. One problem encountered in foam molding such painted parts is that, when the part is removed from the mold, a thin paint flash must be trimmed off the part. The paint flash is a thin paint fin extending around the part at the parting line of the mold and results from the inability to spray paint the mold in a manner such that no paint is applied to the parting faces of the mold around the edge of the cavity. One attempt to overcome this problem resides in applying the paint coating to the interior surfaces of the mold by conventional silk screen transfer methods. The silk screen transfer method is costly and must be practiced very precisely to eliminate the paint flash in its entirety.

The object of the present invention is to eliminate the necessity for trimming the paint flash from the molded part as the parting line.

A more specific object of this invention is to remove the paint from the parting line of the mold in a simple and economical manner.

More specifically, in accordance with the present invention the cavities of the open mold are sprayed with paint without exercising extreme caution with respect to whether the overspray contacts the parting faces of the mold. While the paint is still wet the line of intersection between the mold cavity and the parting face of the mold is contacted throughout its extent with a member that serves to break the continuity of the paint film at this line of intersection. Thereafter, when the paint film is at least partially dry, the mold is closed and the foam resin part is molded. Since the continuity of the paint film on the mold is interrupted at the line of intersection between the mold cavity and the parting faces of the mold, the molded part does not have a paint flash in the form of a fin extending around the molded part at the parting faces of the mold.

Other objects, features and advantages of the present invention will become apparent from the following description and accompanying drawing, in which.

Figure 1:
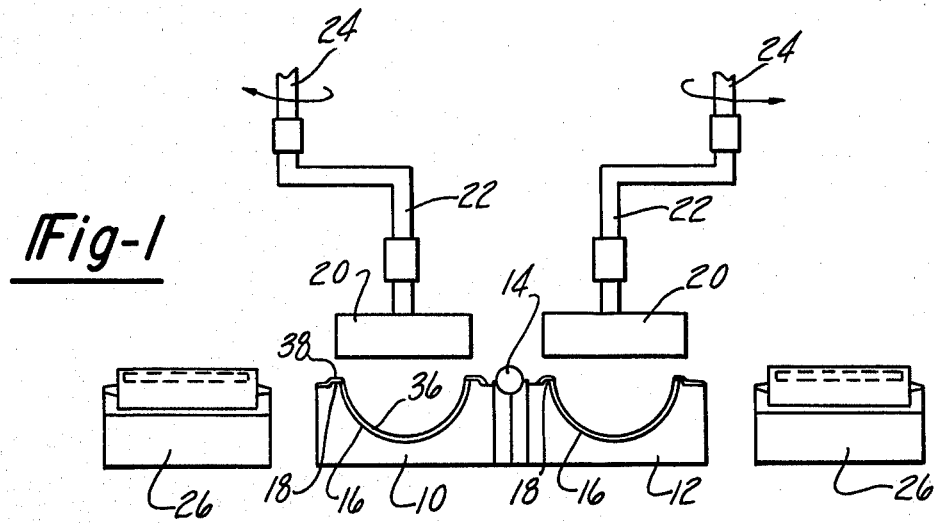
FIGS. 1, 2, 3 and 4 are schematic views showing the progressive steps of the method in accordance with the present invention and one form of apparatus useable therewith.

In FIG. 1 there is illustrated a pair of foam mold halves 10,12 which are hinged together as at 14. Each mold half is formed with a cavity 16 which terminates in a parting face 18 that extends peripherally around the edge of the cavity. In the arrangement illustrated cavities 16 form a sphere when the mold is closed and the parting faces 18 of the two mold halves are in abutting relation.

Figure 2:
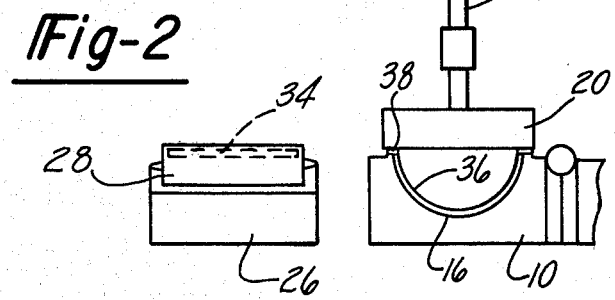
Figure 3:
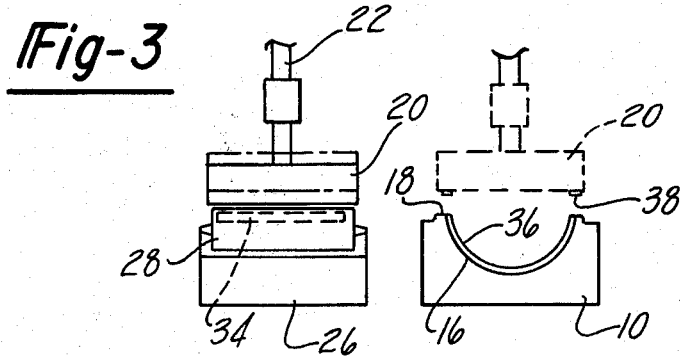
Figure 6:
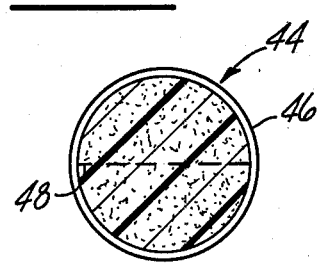
FIG. 6 is a sectional view of the painted part as molded, the thickness of the paint layer being shown highly exaggerated.
Figure 4:
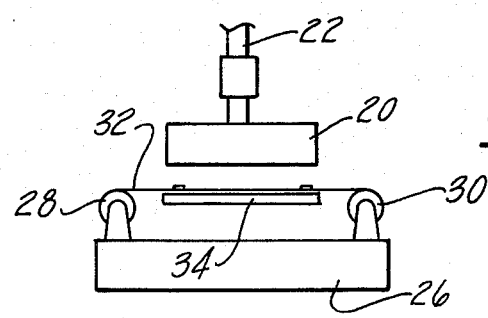

Above the parting faces 18 of each mold half there is arranged a paint pick-up pad 20 formed of a material to which the hereinafter mentioned paint will readily adhere. Pads 20 are formed of a material such as silicone rubber which is at least slightly compressible. Each pad 20 is supported at the lower end of a crank 22 that is journalled for rotation in a horizontal plane by a shaft 24 which is also adapted to be reciprocated vertically. Adjacent each mold half 10,12 there is arranged a base 26 on which a paper supply roll 28 and a paper take-up roll 30 (FIG. 4) are journalled. A web of paper 32 is incrementally indexed from supply roll 28 to take-up roll 30. Intermediate these two rolls there is mounted on base 26 a back-up plate 34 which underlies the portion of the web 32 extending between these two rolls. Cranks 22 and shafts 24 are arranged to first lower pads 20 into contact with the parting faces 18 of the two mold halves (FIG. 2), then lift the pads and swing them into positions overlying the back-up plates 34. Thereafter the pads are again lowered into contact with the web 32 (FIG. 3). Finally, the pads are again lifted and swung back to the position shown in FIG. 1.

In accordance with the present invention, when the pads 20 are rotated from the position overlying the open mold halves, the mold cavities are sprayed with a layer of paint that is compatible with the foam resin to be molded. Many such paints are commercially available and well known. When the mold cavities are sprayed a film of paint is unavoidably also applied to the portions of parting faces 18 immediately surrounding the cavities. In the arrangement illustrated the paint film applied to the mold is shown highly exaggerated in thickness. The paint film within the mold cavity is designated 36 and the paint film overlying the parting faces 18 is designated 38. When sprayed, the paint extends as a continuous film from within the cavities and onto the parting faces 18. After the cavities are so sprayed and while the paint is still wet, the two pads 20 are revolved into positions overlying the two mold halves (FIG. 1) and then lowered so that the bottom faces of the pads 20 are brought into engagement with the parting faces 18 (FIG. 2). The pads thus lift the film of paint 38 off of the parting faces 18 when they are raised to the broken line position of FIG. 3. Thereafter, the pads 20 are swung outwardly and lowered into engagement with the web 32 as shown in full lines in FIG. 3 so that the portions of the paint film 38 lifted off of the parting faces 18 are transferred to the paper web 32. The film of paint 36 in the mold cavities consequently terminates at the line of intersection 40 (FIG. 5) between the cavities 16 and the parting faces 18. If desired, the parting faces 18 on the two mold halves can be inclined slightly relative to the horizontal so that, when the mold is closed, the parting faces 18 on the two mold halves diverge at least slightly from one another, in which case the paint film may be lifted only from the portion of the parting faces immediately surrounding the cavities. Thereafter, when the mold is closed, a paint film extends continuously over the surfaces of the mold cavity but is interrupted around the line of intersection 40 between the mold cavities and the parting faces. After the paint has at least partially dried the mold is closed and the resin is introduced. When the cured foamed resin part 44 is removed from the mold, the outer surface thereof will have a continuous coat of paint transferred thereto and there will be no paint flash on the part around the portion 48 corresponding to the parting line of the mold.

In the arrangement illustrated in FIGS. 1 thru 4 the portion of the paint film 36 lifted off of parting faces 18 is transferred to the paper web 32 and web 32 is indexed after each cycle of operation to present a clean section of paper. When transferring the paint film from the parting faces 18 to the paper web 32 it will be appreciated that the paint formulation must be such that the paint remains sufficiently wet to be transferred from the pads 20 to the web 32. This can be controlled by the type and the amount of solvents in the paint. However, the use of the separate web 32 can be eliminated, if desired, by utilizing a blotting type of paper on the lower faces of the pads 20, in which case the blotting paper will be replaced periodically.

Figure 5:
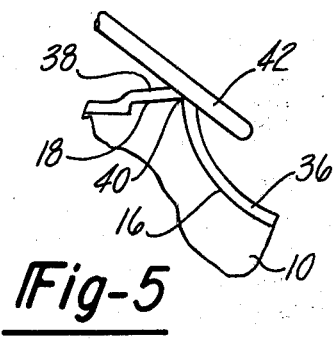
FIG. 5 is an enlarged, fragmentary sectional view showing a modified method according to the present invention.

An extremely simple method of eliminating the paint flash from the molded part is shown in FIG. 5. In accordance with this method, after the mold cavities are sprayed, the line of intersection 40 between the mold cavity 16 and the parting face 18 is manually wiped with a plastic, wood or other type of rod 42 to which the paint will adhere or which at least displaces the paint from the line of intersection. This will interrupt the continuity of the paint film at the sharp line of intersection 40 and thus results in the elimination of a paint flash around the molded part at the parting line of the mold. When the method shown in FIG. 5 is employed, after several cycles the dry paint 38 accumulated on the parting faces can be easily manually stripped as an integral film from the parting faces 18 of the mold halves.

I claim:

1. The method of eliminating paint flash at the parting line of a foamed resin article formed in a mold, the interior molding surfaces of which are sprayed with a paint before the foam resin material is introduced into the mold and which paint becomes integrally bonded to the exterior surface of the foamed resin article, which comprises spraying the cavity surface of the open mold which forms the painted surface of the molded article with a paint compatible with the foam resin; permitting the paint spray to extend beyond the confines of the mold cavity and onto the parting faces of the mold which intersect and peripherally surround said cavity surface; and, while said paint is still wet, contacting at least the line of intersection between said parting faces and said cavity surfaces substantially throughout its lineal extent with a member adapted to interrupt the continuity of the wet paint layer between the cavity and parting face surfaces at said line of intersection; permitting paint in the cavity to at least partially dry after its continuity has been interrupted to thereby reduce its fluidity such that the interrupted portions thereof will not flow back together when the mold is thereafter closed; thereafter closing the mold and introducing said foam resin material; and, after said foam resin material has cured, opening the mold and removing the molded part therefrom whereby the paint layer on said parting surfaces remains separated from the layer of paint on the foamed article removed from the cavity.

2. The method called for in claim 1 wherein said member is of the type to which wet paint will adhere.

3. The method called for in claim 2 including the step of removing the paint from said member before it is again contacted with the mold.

4. The method called for in claim 2 wherein said member comprises a compressible pad having a surface portion conforming in contour to that of said line of intersection.

5. The method called for in claim 2 wherein said member comprises a compressible pad having a surface portion which conforms in contour with the portion of said parting surfaces which surround and extend to said line of intersection so that said member lifts the paint from said surrounding surfaces.

6. The method called for in claim 4 or 5 including the step of removing the paint from said pad to permit repeated use of the pad.

7. The method called for in claim 4 or 5 including the step of contacting said conforming surface of said pad with a blotting member to remove the paint from the pad.

8. The method called for in claim 2 wherein said member is a blotting material adapted to absorb the paint.

9. The method called for in claim 1 wherein said member comprises a rod and said line of intersection is contacted by wiping the rod around said line of intersection to substantially remove the paint therefrom.

10. The method called for in claim 9 wherein the rod is inclined to the parting face of the mold and the adjacent surface of the mold cavity so that it engages the mold substantially only at said line of intersection.

11. The method called for in claim 10 wherein said rod is formed of a material to which the paint will adhere.

* * * * *